United States Patent
Otsuka et al.

(10) Patent No.: US 6,335,603 B1
(45) Date of Patent: Jan. 1, 2002

(54) MOTOR CONTROL CIRCUIT AND CONTROL SYSTEM USING THE SAME

(75) Inventors: Toru Otsuka, Fujisawa; Takeo Hashimoto, Kawasaki; Hiroshi Watanabe, Chigasaki, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/653,873

(22) Filed: Sep. 1, 2000

(30) Foreign Application Priority Data

Sep. 3, 1999 (JP) .......................................... 11-250515
May 23, 2000 (JP) .......................................... 12-151422

(51) Int. Cl.[7] ............................................. G05B 19/25
(52) U.S. Cl. ..................... 318/571; 318/561; 318/600; 318/603; 388/912
(58) Field of Search ................................. 318/571, 603, 318/600, 561; 388/912

(56) References Cited

U.S. PATENT DOCUMENTS 3,983,468 A * 9/1976 Maitrias ..................... 318/685
4,287,461 A * 9/1981 Promis et al. ............... 318/571
5,847,659 A   12/1998 Mugitani .....................

* cited by examiner

*Primary Examiner*—Karen Masih
(74) *Attorney, Agent, or Firm*—Pillsbury Winthrop LLP

(57) ABSTRACT

Disclosed herein are a motor control circuits and a control system comprising the motor control circuits. Each motor control circuit comprises a pulse generation counter for counting a clock and generating control pulses, a pulse counter for counting the control pulses, a rate data conversion ROM for converting the speed data to a count value used in the pulse generation section, first holding section for holding at least the information concerning the upper and lower limits of the speed, second holding section for holding at least the information concerning the acceleration and deceleration speeds, and speed change section for increasing or decreasing the speed data gradually by counting the count of the pulse counting section from the lower to the upper limit of the speed held in the first holding section with a value corresponding to the acceleration or deceleration speed held in the second holding section, and giving the instructions of rewriting each value and of starting and stopping the operation corresponding to a predetermined command from the main control section.

20 Claims, 8 Drawing Sheets

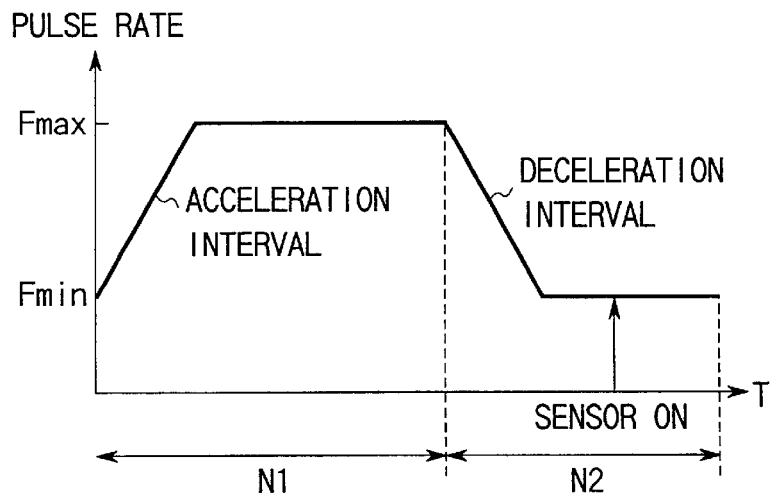
FIG. 5A
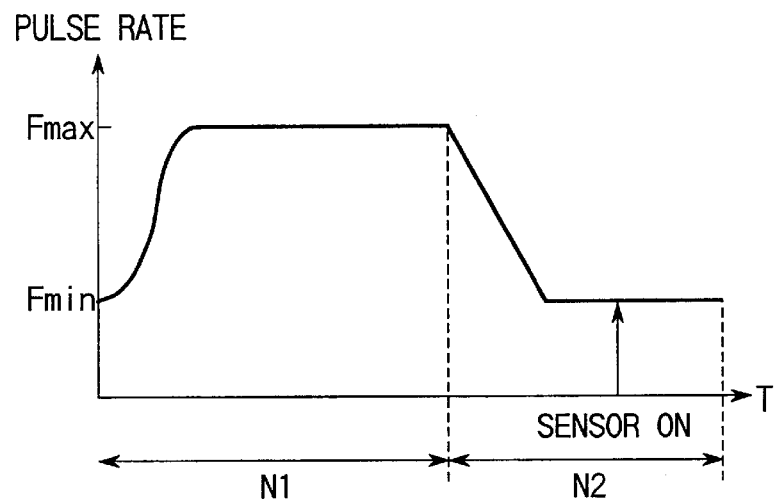
FIG. 5B
| ADDRESS (FREQUENCY) | DATA (COUNT VALUE) |
|---|---|
| 0 | INEFFECTIVE |
| 1 | 50.000 (500.000/10) |
| | |
| 254 | 1969 (500.000/254) |
| 255 | 1961 (500.000/255) |
FIG. 6

| ADDRESS (PULSE COUNT) | DATA (FREQUENCY) |
|---|---|
| 0 | F0 |
| 1 | F1 |
|  |  |
| 62 | F62 |
| 63 | F63 |
FIG. 7
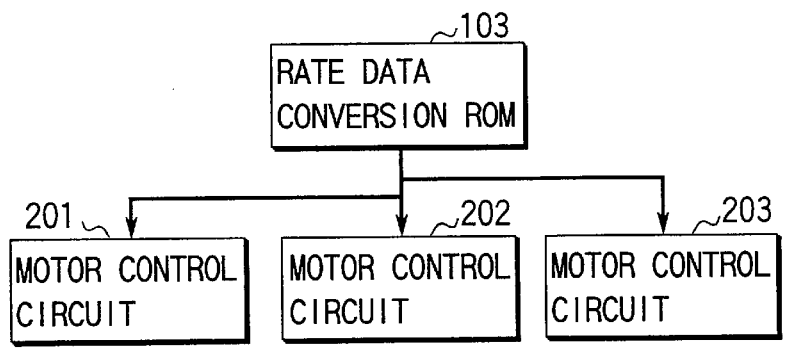
FIG. 8
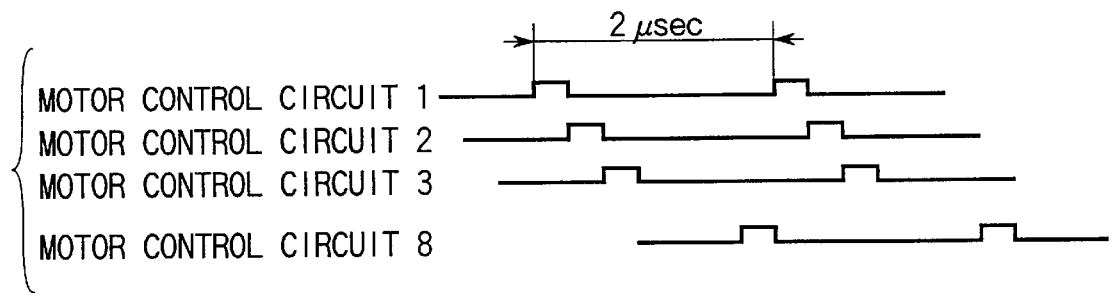
FIG. 9

MOTOR CONTROL CIRCUIT AND CONTROL SYSTEM USING THE SAME

CROSS-REFERENCE TO RELATED APPLICATIONS

This application is based upon and claims the benefit of priority from the prior Japanese Patent Applications No. 11-250515, filed Sep. 3, 1999; and No. 2000-151422, filed May 23, 2000, the entire contents of which are incorporated herein by reference.

BACKGROUND OF THE INVENTION

The present invention relates to a motor control circuit and a control system comprising a main control section and unit control sections connected to said main control section.

Conventionally, a number of pulse motors are provided in a medium conveying apparatus for conveying a medium such as paper or the like in order to separate and transfer the medium and for other purposes.

To control these motors, motor control pulses are generated by means of the CPU of the main control section, are transmitted to the unit control sections via serial circuits and are supplied to the pulse motors.

However, when motor control pulses are generated by the CPU as in the above-described prior art, the particular CPU is overloaded. Further, since the pulses are transmitted via the serial circuits, the data thereof become large in amount.

BRIEF SUMMARY OF THE INVENTION

The present invention has been made in consideration of the above-described problems. The first object of the invention is to make it possible to set and operate the pulse generation circuit via serial circuits, and to eliminate the necessity of transmitting the driving pulses via the serial circuits, by providing a pulse generation circuit on the unit control section side. The second object of the invention is to make it possible to diagnose the states of operation by obtaining the count of really generated pulses after the operation of the pulse generation circuit. The third object of the invention is to make it possible to accelerate and decelerate the pulse rate linearly and to set the rate of each pulse partially. The fourth object of the invention is to provide a motor control circuit that can not only reduce the cost but also accomplish complex motor control and a control system that uses the same.

In order to attain the above-described objects, in the first embodiment of the present invention, a motor control circuit for use in a control system a main control section and unit control section connected to the main control section controlling the circuit of the pulse motor, the unit control section comprising: pulse generation means for generating control pulses of desired frequency by dividing the basic clock by a predetermined count value; pulse count means for counting the control pulses; first means for holding at least the information concerning the upper and lower limits of the speed: second means for holding at least the information concerning the acceleration and deceleration speeds; speed change means for increasing or decreasing the speed data gradually by counting the count of the pulse count means from the lower limit to the upper limit of the speed held in the first means, in accordance with a value corresponding to the acceleration or deceleration speed held in the second means; and means for instructing the rewriting the values held in the first and second means and the starting and stopping of the operation, wherein the rotation of the pulse motor is controlled in accordance with the commands supplied from the main control section.

In the second embodiment of the present invention, a control system including a main control section and unit control section connected to the main control section and having a plurality of motor control circuits, the motor control circuit comprising: means for generating a basic clock; pulse generation means for generating control pulses of desired frequency by dividing the basic clock by a predetermined count value; pulse count means for counting the control pulses; rate data conversion means for converting the speed data into a count value used in the pulse generation means; first means for holding at least the information concerning the upper and lower limits of the speed; second means for holding at least the information concerning the acceleration and deceleration speeds; and means for increasing or decreasing the speed data gradually by counting the count of the pulse count means from the lower limit to the upper limit of the speed held in the first means, in accordance with a value corresponding to the acceleration or deceleration speed held in the second means, wherein the rate data conversion means is shared by the plurality of motor control circuits by setting different operation clocks in the plurality of motor control circuits.

In the third embodiment of the present invention, a control system including a main control section and unit control section connected to the main control section, the main control section comprising means for holding a predetermined command for controlling the operation of the unit control section, and the unit control section comprising: motor control circuit comprising; means for generating a basic clock; pulse generation means for generating control pulses of desired frequency by dividing the basic clock by a predetermined count value; pulse count means for counting the control pulses; means for converting the speed data into a count value used in the pulse generation means; first means for holding at least the information concerning the upper and lower limits of the speed; second means for holding at least the information concerning the acceleration and deceleration speeds; speed change means for increasing or decreasing the speed data gradually by counting the count of the pulse count means from the lower to the upper limit of the speed held in the first means, in accordance with a value corresponding to acceleration or deceleration speed held in the second means; and command run means for giving the instructions of rewriting the values held in the first and second means and of starting and stopping the operation corresponding to a predetermined command from the main control section.

In the fourth embodiment of the present invention, a motor control circuit including a main control section and unit control section connected to the main control section and controlling the circuit of the pulse motor is provided, wherein the unit control section have pulse generator obtaining control pulses of desired frequency by dividing the basic clock by a predetermined count value, pulse counter counting the control pulses, first storage holding at least the information concerning the upper and lower limits of the speed, second storage holding at least the information concerning the acceleration and deceleration speeds, speed changer increasing or decreasing the speed data gradually by counting the count of the pulse counter from the lower limit to the upper limit of the speed held in the first storage, in accordance with a value corresponding to the acceleration or deceleration speed held in the second storage, and instructor to rewriting the values held in the first and second storage and to starting and stopping the operation, wherein the rotation of the pulse motor is controlled corresponding to the commands from the main control section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 5A shows a method of controlling the linear acceleration and deceleration;

FIG. 5B shows a method of controlling the free curve acceleration and deceleration;

FIG. 6 shows the contents of rate data RAM 125;

FIG. 7 shows the contents of rate data conversion ROM;

FIG. 8 shows the sharing rate data conversion ROM 103 provided in the plurality of motor control circuits 201 and 203;

FIG. 9 is a timing chart showing the operation in the configuration of FIG. 8;

DETAILED DESCRIPTION OF THE INVENTION

Figure 1:
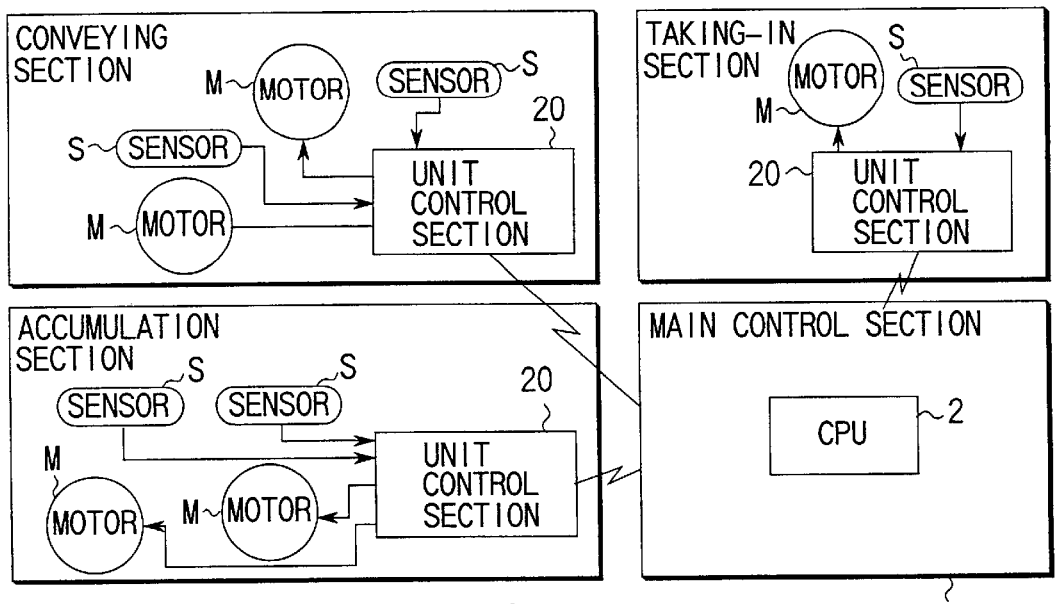
FIG. 1 shows a medium conveyance control system conveying a medium, for example, paper.

The embodiments of the present invention will be described with reference to the drawing.

FIG. 1 shows a control system for conveying a medium such as paper or the like. As shown in FIG. 1, unit control sections 20 of a conveying section, taking-in section and accumulation section are connected to a main control section 1 by serial circuits, respectively. One or more sensors S for detecting the condition and the position of paper or the like and a motor M for driving the conveying system are connected to each unit control section 20.

Figure 2:
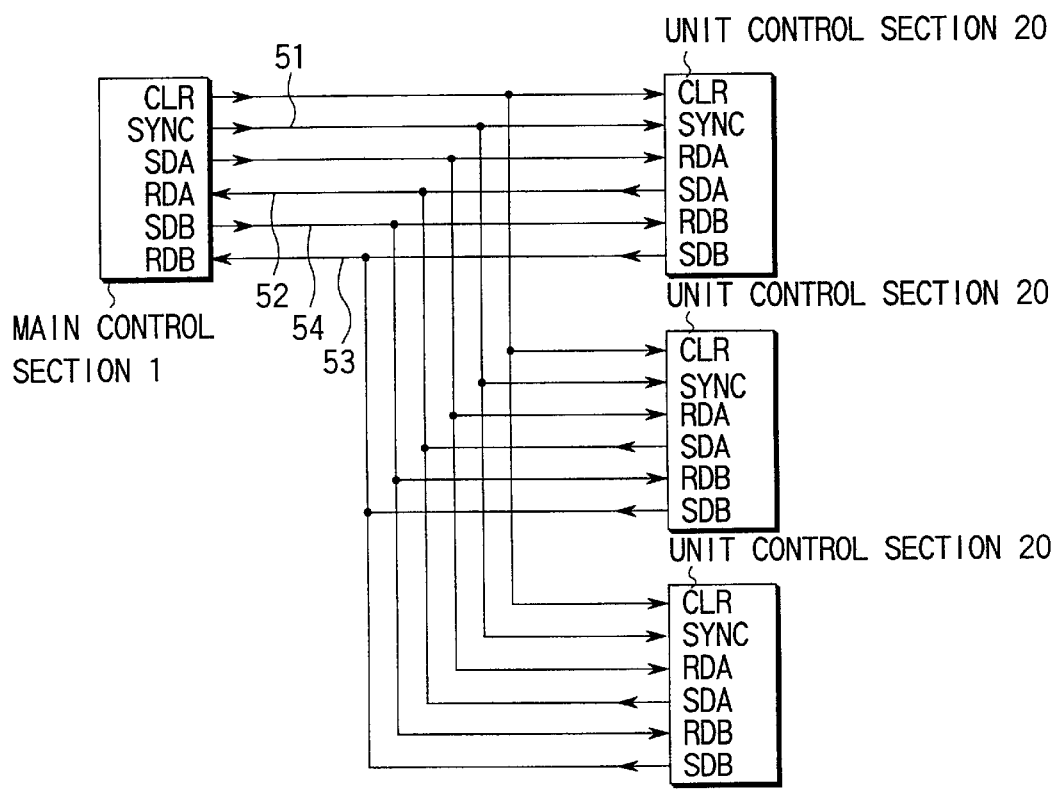
FIG. 2 shows the connection of the serial circuit between main control unit 1 and each unit control section 20.

As shown FIG. 2, the control sections 20 are connected in parallel to the main control section 1.

Here, "SDA" is the data transmitted, composed of a start mark, the number of unit control sections connected, a common command, output port data and command data. The data SDA is repeated, for 512 bits in one cycle, if a clock signal of 32 MHz is used, data will be transmitted in a cycle of 128 μs.

"RDA" is the data received. The data RDA consists of two data items, i.e., input port data and response data responding to the command. The unit control section 20 counts pulse after the start mark has been detected, and transmits 16 input port data items the number of pulses counted reaches the value corresponding to its identification number. Responding to the command, the particular unit control section 20 sends echo back data sending back the command as it is and response data as a run result of the command.

Figure 3A:
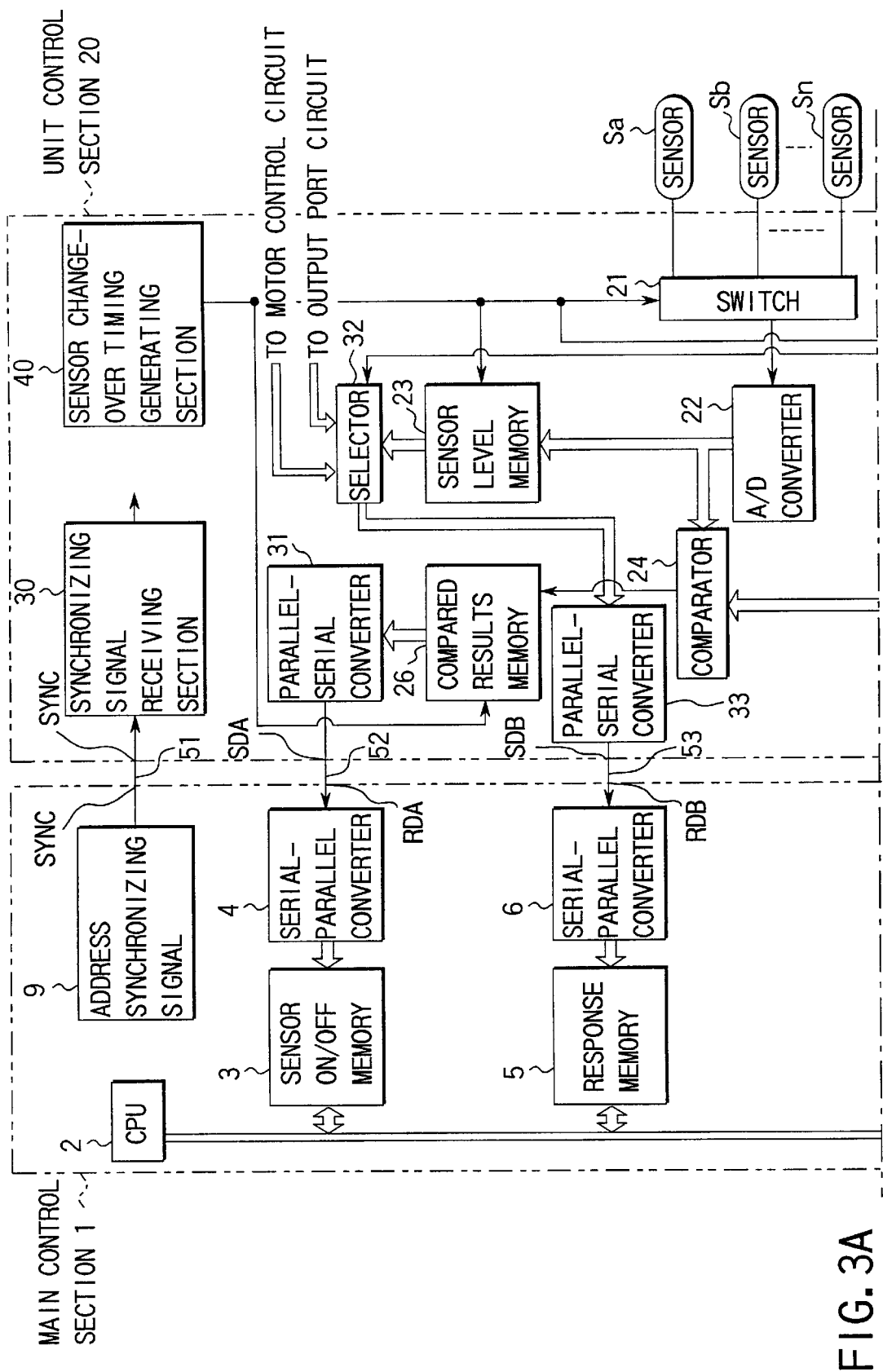
FIGS. 3A and 3B show the main control section 1 and unit control section 20.
Figure 3B:
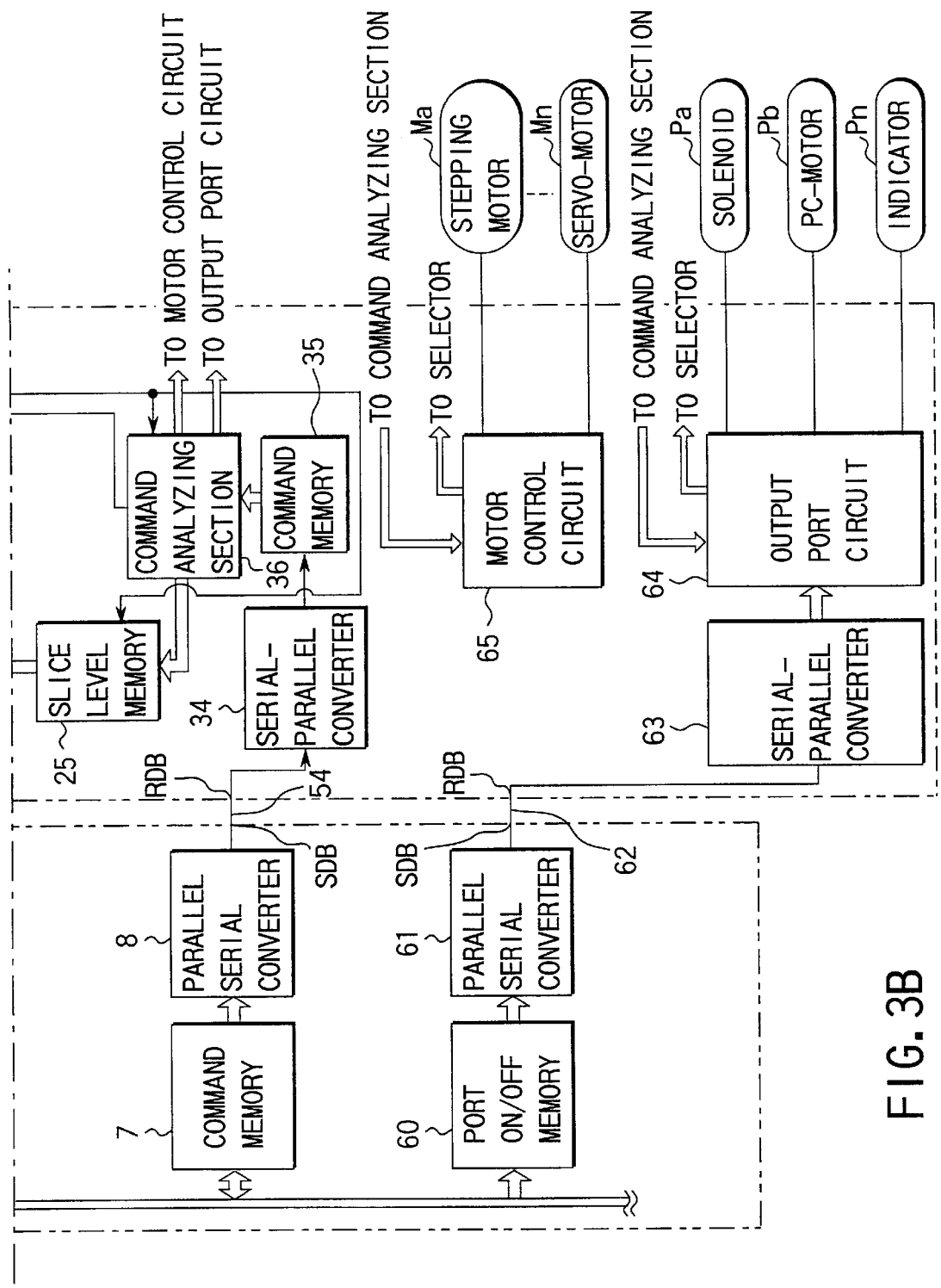

FIGS. 3A and 3B show the major components of the main control section 1 and unit control section 20. As shown in FIGS. 3A and 3B, the main control section 1 has a CPU 2 which is a central processing unit. A sensor ON/OFF memory 3, response memory 5, command memory 7, and port ON/OFF memory 60 are connected to the CPU 2.

The sensor ON/OFF memory 3 is connected to a serial circuit 52 via a serial-parallel converter 4. The response memory 5 is connected to a serial circuit 53 via a serial-parallel converter 6.

The command memory 7 is connected to a serial circuit 54 via a serial-parallel converter 8. The port ON/OFF memory is connected to a serial circuit 62 via a serial-parallel converter 61.

The main control section 1 has an address synchronizing signal generating section 9, which is connected to a serial circuit 51.

The unit control section 20 has a switch 21. A plurality of sensors Sa, Sb, . . . Sn are connected to the switch 21.

The switch 21 repeats a time-sharing scanning, based on a timing signal supplied from a sensor change-over timing generating section 40, thus causing each sensor to output a signal (hereafter referred to as "sensor signal").

The level of each sensor signal selected by the switch 21 is converted into digital data by an A/D converter 22. The digital data is not only held in a sensor level memory 23, but also supplied to a comparator 24. The comparator 24 compares each sensor level data supplied from said A/D converter 22 with a plurality of slice levels held in a slice level memory 25. The results of the comparison are held in a comparison result memory 26.

The slice level memory 25 outputs a slice level corresponding to each sensor at the same timing as the scanning by the switch 21, based on the timing signals supplied from the sensor change-over timing generating section 40.

The comparison results held in the memory 26 are output sequentially, in accordance with timing signals (not shown) which are independent of sensor scanning. The results are converted into serial signals by a parallel-serial converter 31. The serial signals are transmitted to the serial-parallel converter 4 incorporated in the main control section 1 via the serial circuit 52.

Each sensor level data stored in said sensor level memory 23 is read out, in accordance with a timing signal (not shown) which is independent of sensor scanning. The sensor level data is converted into a serial signal by a parallel-serial converter 33 after being selected by a selector 32, in response to the instructions supplied from a command analyzing section 36 (described later). The serial signal is transmitted to the serial-parallel converter 6 provided in the main control section 1 via said serial circuit 53.

A serial-parallel converter 34 receives a command from the parallel-serial converter 8 via the serial circuit 54 and converts the command into a parallel command. The parallel command is held in a command memory 35 is analyzed by a command analyzing section 36.

Upon analyzing the predetermined command in the command memory 35, the command analyzing section 36 gives instructions to the selector 32 to transmit the sensor level data from the sensor level memory 23 to the main control section 1.

This selector 32 outputs either the data read from the sensor level memory 23 or the command supplied from the command analyzing section 36 (i.e., a sent back command for checking echo back), in accordance with the instruction from the command analyzing section 36. The command analyzing section 36 analyzes a plurality of slice levels on the basis of the predetermined commands held in the command memory 35. The analyzed results are held in the slice level memory 25. Upon receipt of a command transmitted from the main control section 1, the command analyzing section 36 supplied a command having the same contents as the received one, immediately to the main control section 1 via the selector 32 and the parallel-serial converter 33.

A synchronizing signal receiving section 30 is connected to the address synchronizing signal generating section 9 via the serial circuit 51. The section 30 receives synchronizing signals from the address synchronizing signal generating section 9.

The operation of a motor control circuit 65 will be described.

The motor control circuit 65 is controlled by parameters such as the initial speed, maximum speed, acceleration rate, deceleration rate, operation factor and the like of the motor and by commands such as operation start, operation stop and the like. The CPU 2 writes the parameters and the commands to be sent to the motor control circuit 6, into the command memory 7.

The parallel-serial converter 8 serializes the contents of the command memory 7. The contents serialized are transmitted to the serial-parallel converter 34 via the serial circuit 54. The parameters and commands parallelized by this serial-parallel converter 34 are written into the command memory 35. The contents of the parameters and commands are analyzed by the command analyzing section 36, like the sensor circuit control commands (sensor level read command, slice level setting command). The parameters and commands are sent to the motor control circuit 65 to be transmitted to the motor control circuit 65.

The motor control circuit 65 operates in accordance with the parameters and commands. When the parameters and commands indicate that the results of the operation should be sent back, the results are sent to the selector 32.

The command analyzing section 36 controls the selector 32 at the same time and supplies the results of operation from the motor control circuit 65 to the serial-parallel converter 33. As a result, the results of operation are stored into the response memory 5 and can be read by the CPU 2.

In summary, sharing the route used in controlling the sensors, the commands and the like for controlling the motor control circuit 65 can be sent from the main control section 1 to the side of the unit control sections 20 by the serial transmission. The responses from the motor control circuit 65 can be sent back by the serial transmission via the same route.

The operation of a output port circuit 64 will be described.

The CPU 2 writes "1" at an address corresponding to the output port of the port ON/OFF memory 60 to turn on the memory 60, and "0" at the address to turn off the memory 60. The parallel-serial converter 61 serializes the contents of the port ON/OFF memory 60 and transmits them to a serial-parallel converter 63 via the serial circuit 62. The output port ON/OFF information parallelized by the particular serial-parallel converter 63 is read by the output port circuit 64. The circuit 64 sets the output of the predetermined port. When the results of operation are required as in said motor control circuit 65, they are sent to the response memory 5.

Figure 4:
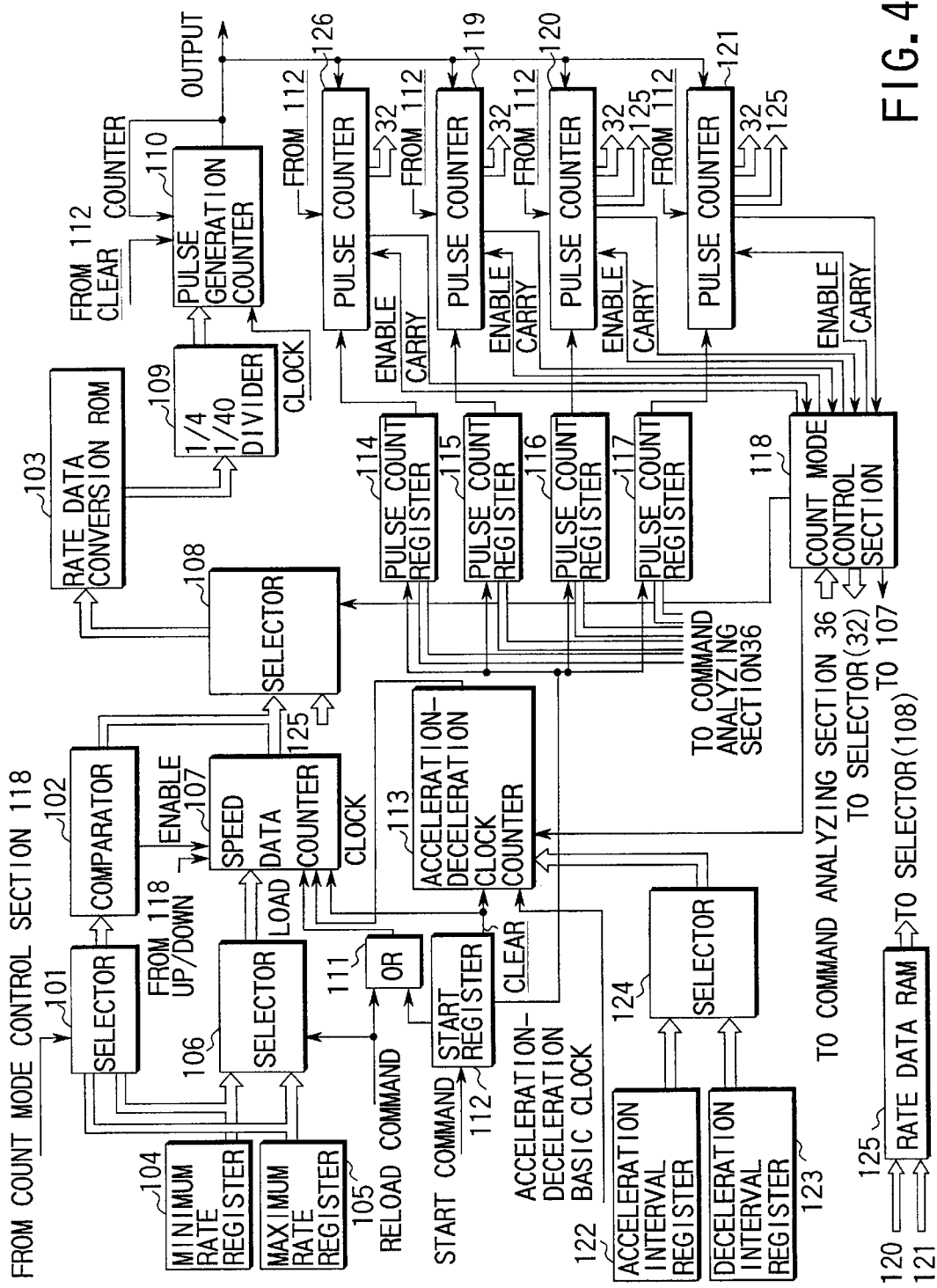
FIG. 4 shows the motor control circuit 65.

FIG. 4 shows the motor control circuit 65. As shown in FIG. 4, the outputs of a minimum rate register 104 and maximum rate register 105 are connected to the inputs of selectors 101 and 106. The output of the particular selector 101 is connected to the input of the comparator 102. The output of the particular selector 106 is connected to the input of a speed data counter 107. The output signals of a counter mode control section 118 can be inputted to said selector 101. A reload command can be inputted to said selector 106. An enable signal can be inputted from said comparator 102 to the speed data counter 107. The command and the enable signal are connected to the input of a selector 108.

The output of a start register 112, to which a start command is inputted, is connected to the inputs of a OR-circuit 111. The speed data counter 107 and an acceleration-deceleration clock counter 113, and the outputs of this OR-circuit 111 and the acceleration-deceleration clock counter 113 are connected to the input of the speed data counter 107. The outputs of an acceleration interval register 122 and a deceleration interval register 123 are connected to the input of said acceleration-deceleration clock counter 113 via a selector 124.

The acceleration-deceleration clock counter 113 starts counting pulses upon receipt of the output of start register 112. It generates a predetermined output, while counting the pulses of the basic acceleration-deceleration clock at the acceleration intervals or the deceleration intervals selected by said selector 124.

The output of the selector 108 is connected to the input of the rate data conversion ROM 103. The output of this rate data conversion ROM 103 is connected to the input of a divider 109. The output of this divider 109 is connected to the input of a pulse generation counter 110. This pulse generation counter 110 outputs a motor operation clock signal (described later).

This clock signal is inputted also to pulse counters 126, 119, 120 and 121.

In such a configuration, the pulses are generated by the pulse generation counter 110. These pulses are not only outputted outside, but also used as operation pulses to a stepping motor Ma and a servo motor Mn. A clock signal (for example, a clock signal of 500 kHz) is supplied to the pulse generation counter 110. The clock signal is divided by a count value supplied from the divider 109. The pulse generation counter 110 obtains desired pulses.

The count value is reloaded after being synchronized with the leading edge of a pulse. The pulse generation counter 110 therefore renews a count value per one pulse (hereafter referred to as "counter load").

Now, a method of generating the count value will be described in detail.

The count value is derived of the relation of "desired clock frequency=basic clock frequency/count value". Therefore, it is necessary to load a count value obtained from "basic clock frequency/count value" into the pulse generation counter 110. According to the present invention, the count value can be obtained by using the rate data conversion ROM 103, and, as shown in FIG. 6, by utilizing the value of a desired clock frequency data as an address. A corresponding count value can be obtained. For example, the data is ineffective if the address is 0, and 50000 (count value 500000/10) is obtained if the address is 1.

When said count value contains a small number of bits, an accurate clock frequency of the output can not be obtained due to a carry-down by the division. Therefore, the frequency data is composed of 1 byte, while the data concerning the count value is composed of 2 bytes. Further, the frequency data is set to 1/10 of the actual frequency.

Now, a method of generating desired frequency data supplied to the rate data conversion ROM 103 will be described in detail.

In a motor control circuit according to the invention, the motor control circuit has two kinds of circuits for generating frequency data. One is a circuit for generating linear acceleration-deceleration data, and the other is a circuit for generating free curve acceleration-deceleration data.

FIG. 5A shows a method of controlling a linear acceleration-deceleration. FIG. 5B shows a method of controlling a free curve acceleration-deceleration. Further, in FIGS. 5A and 5B the longitudinal axis represents pulse rate, and the lateral axis represents time.

The value of Fmin is stored in the minimum rate register 104. This being the starting point, the acceleration starts in an interval held in the acceleration-deceleration register 122. When Fmax is reached, the acceleration is stopped. The value of Fmax is held in the maximum rate register 105. When the count value reaches the pulse count N1, the deceleration is started. This deceleration interval is held in the deceleration interval register 123. When Fmin is reached, the deceleration is stopped and the motor is driven at constant speed. When the count value reaches the pulse count N2, the operation is stopped. Since the sensor is has been turned on in advance, the operation is stopped before the count value reaches the pulse count N2.

In FIG. 5B, free curve acceleration-deceleration is performed till the value of Fmax is reached from the value of Fmin, in contrast to the case shown in FIG. 5A. Other operations are performed with said linear acceleration-deceleration. These controls will be described later.

The operation of the circuit for generating linear acceleration-deceleration data will be described in more detail.

The functions of the circuit are realized by the speed data counter 107, start register 112, minimum rate register 104, maximum rate register 105, selector 106, acceleration interval register 122, deceleration interval register 123, selector 124, acceleration-deceleration clock counter 113 and the like.

The speed data counter 107 generates frequency data.

More specifically, when the start command is inputted to the register 112, the start register 112 is turned on. At the same time the register 112 is turned on, the value (Fmin) of the minimum rate register 104 is loaded into the speed data counter 107 via the selector 106, CLEAR is released, whereby the predetermined count starts. Therefore, the frequency data before count up is a load value (Fmin) supplied from the minimum rate register 104.

The acceleration-deceleration clock counter 113 loads the count value from the acceleration interval register 122 via the selector 124. The counter 113 generates a predetermined clock signal defining the acceleration interval by counting the basic acceleration-deceleration clock only by the loaded count value. The counter 113 outputs the clock signal to the speed data counter 107. Therefore, the speed data counter 107 counts up, based on the clock from the acceleration-deceleration clock counter 113. The counter 107 changes the pulse rate in a predetermined acceleration interval. Thus, when the loaded value Fmax is reached, the acceleration is stopped.

In acceleration, a count value (Fmax) of the maximum rate register 105 is loaded into the speed data counter 107 via the selector 106. Therefore, the maximum value of the frequency data after count up is the loaded value (Fmax) supplied from the maximum rate register 105. The acceleration-deceleration clock counter 113 loads the count value from the deceleration interval register 123 via the selector 124. The counter 113 generates a predetermined clock signal defining the deceleration interval by counting the basic acceleration-deceleration clock only by the loaded count value. The counter 113 outputs the predetermined clock to the speed data counter 107. Therefore, the speed data counter 107 counts down, based on the clock from the acceleration-deceleration clock counter 113. The counter 107 changes the pulse rate in a predetermined deceleration interval. Thus, when the loaded value Fmin is reached again, the deceleration is stopped.

The operation of said free curve acceleration circuit will be described.

The functions of this free curve are realized by mainly pulse count registers 114 to 117, pulse counters 126, 119, 120 and 112, count mode control section 118 and the like. These functions will be described in detail.

FIG. 7 shows the memory contents of a rate data RAM 125.

In the rate data RAM 125, frequency data can be set per pulse. For example, the address (pulse count) is 0, data (frequency) is F0, and the address (pulse count) is 1, data (frequency) is F1. Thus, frequency data is written in accordance with the commands supplied from the main control section 1. In order to renew the address, the counter values of the pulse counters 126 and 119 are used. When the pulse counters 126 and 119 count output pulses, outputted frequency data are varied.

The operation of the pulse counters will be described.

When the start register 112 is turned on, the pulse counters 126, 119, 120 and 121 load the values into in the pulse registers 114, 115, 116 and 117 respectively. When they are enabled by the count mode control section 118, they begin to count down. Although the count-down mode is employed here, the mode is not limited thereto.

The count mode control section 118 holds the count mode written from the main control section 1 and operates in each mode.

In the free curve effective mode, count is performed, first in the pulse counter 120, then in the pulse counter 126, next in the pulse counter 121, and finally in the pulse counter 119.

That is, when the count value of each counter is 0, a carry signal is sent to the count mode control section 118, and the next counter that has received an enable signal performs the count operation.

While the pulse counters 120 and 121 are counting, the count mode control section 118 selects the rate data RAM 125 via the selector 108 and performs a free curve operation. While the counters 126 and 119 are counting, it selects the speed data counter and performs a linear acceleration-deceleration operation.

If the pulse counter 126 is selected, the count mode control section 118 designates, as maximum rate, the value inputted to the comparator 102 by the selector 101 and instructs the up-count of the particular counter.

In the acceleration-deceleration mode, the pulse counter 126 is selected first, and the pulse counter 119 is selected subsequently.

When said count mode control section 118 receives a stop command from the main control section 1 in any condition in either mode, the pulse counter 119 is selected unconditionally. After the pulse count set in the pulse count register 115 has been reloaded and the pulses have been counted, the start register 112 is turned off. The pulses are thereby stopped.

When the CPU 2 performs a motor stop control by using a position detection sensor, the motor should be driven a certain amount extra, from the time detecting the position, in order to prevent malfunctions due to backlash.

The present invention can perform the motor stop control without using the CPU 2, since an extra operation pulse count is set in the pulse counter 119 in advance. Further, the values of the pulse count registers 114 to 117 can be written at any time by the CPU 2, achieving complex operations.

When the OR circuit 111 receives a reloaded command of the pulse rate, the value of the minimum rate register 104 or the maximum rate register 105 is loaded into the speed data counter 107 in accordance with the mode of the particular reload command.

This makes it possible, even in the pulse generation operation, to change the minimum rate and the maximum rate and to perform operations in a complex speed scheme.

Each of the pulse counter 126, 119, 120 or 121 outputs the count value held in the selector 32, in accordance with the pulse count get command. The CPU 2 subtracts the held pulse count from the operated pulse count set in each counter, thereby to recognize an actually operated pulse count.

When the count mode control section 118 receives a status-requesting command from the CPU 2, it sends a status such as in-acceleration or the like.

FIG. 8 shows the section in which a plurality of motor control circuits 201 to 203 share the rate data conversion ROM 103.

In this section, the access timing to the rate data conversion ROM 103 shifts by shifting the basic clock (500 kHz) between the motor control circuits 201 to 203, respectively, as shown in the timing chart of FIG. 9. The plurality of the motor control circuits 201 to 203 can therefore read count values from the single rate data conversion ROM 103.

The speed control of the pulse motor according to the present invention will be described in detail.

Figure 10:
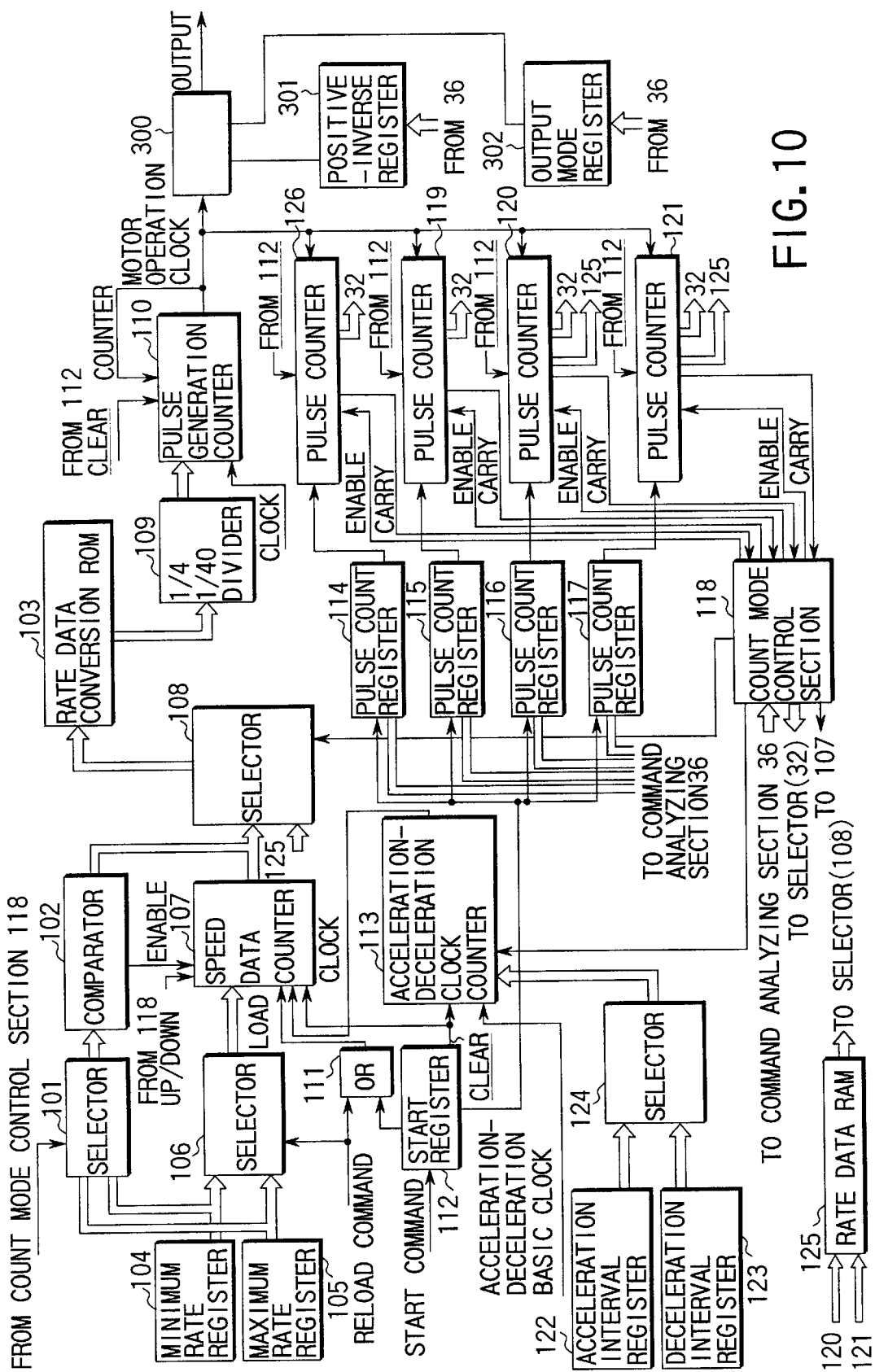
FIG. 10 shows a control system for controlling the speed of the pulse motors according to the present invention.

FIG. 10 shows a control system according to the present invention, in which the speed control of the pulse motor is performed. In FIG. 10, the parts identical to those in FIG. 4 are designated at the identical reference characters. These parts will not be described in detail, and only characteristic features will be described in particular.

As shown in FIG. 10, the motor operation clock signal is inputted from the pulse generation counter 100 to the pulse generation control section 300.

Figure 11:
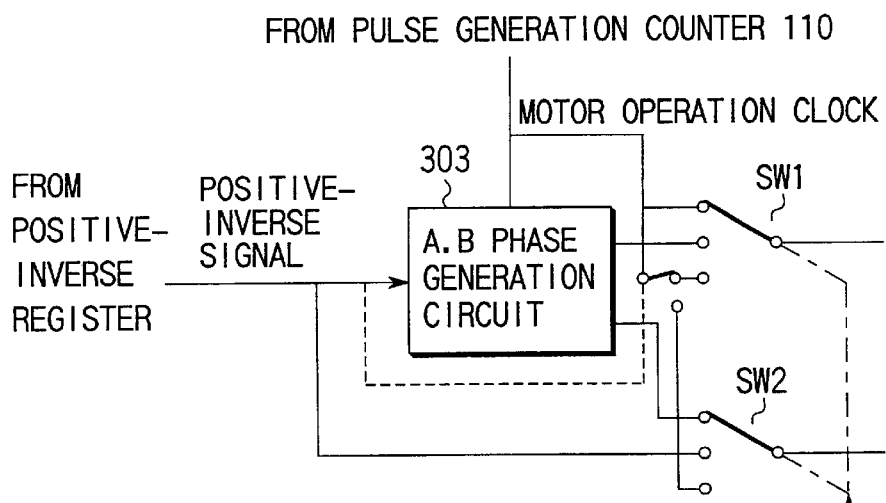
FIG. 11 shows a pulse generation control section 300.

The pulse generation control section 300 has the structure shown in FIG. 11. As shown in FIG. 11, a two-phase generation circuit receives a motor operation clock signal from the pulse generation counter 110 and a positive-inverse signal from a positive-inverse register 301, and outputs a predetermined driving signal. SW1 and SW2 are drivingly controlled by a control signal from an output mode register 302, and a desired driving signal is selectively outputted.

Figure 12A:
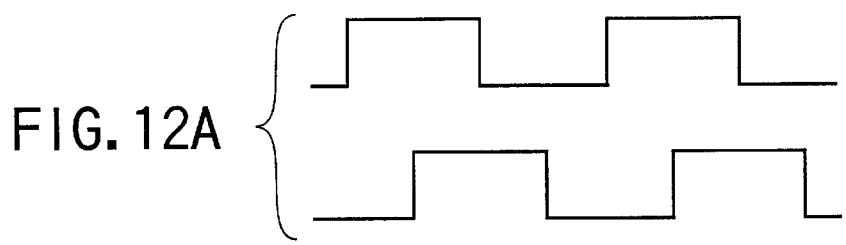
FIG. 12A shows control pulses for controlling the pulse motors having a phase difference of 90 degrees.
Figure 12B:
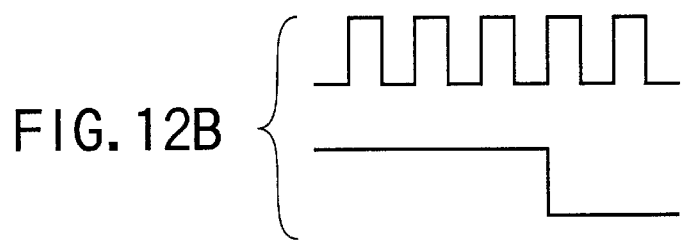
FIG. 12B shows the combination of a basic clock for controlling the pulse motors and a positive-inverse signal.
Figure 12C:
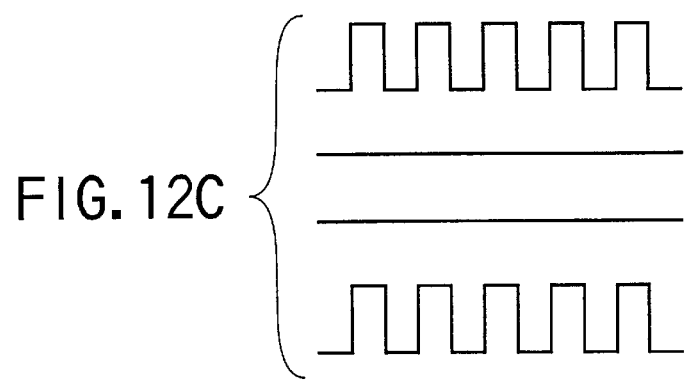
FIG. 12C shows a positive pulse and a negative pulse for controlling the pulse motors.

It is generally known that control pulses as shown in FIGS. 12A to 12C are used when driving a pulse motor.

FIG. 12A shows the case where control pulses having a phase difference of 90 degrees are used. FIG. 12B shows the case where combinations of a basic clock and a positive-inverse signal are used. FIG. 12C shows the case where positive control pulses and negative control pulses are used.

The case shown in FIG. 12B is realized in the embodiment.

In the present invention, the driving range of the pulse motor is set from 10 pps to 2550 pps (in 10 pps), but 4-time mode and 40-time mode can be also set (in 40 pps and 400 pps).

The pulse generation means described in the claims is equivalent to the pulse generation counter 110 shown in FIG. 4. The pulse count means are equivalent to the pulse counters 126, 119, 120 and 121. The rate data conversion means is equivalent to the rate data conversion ROM 103. The first means are equivalent to the minimum rate register 104 and the maximum rate register 105. The second means are equivalent to the acceleration interval counter 122 and the deceleration counter 123. The speed change means is equivalent to the speed data counter 107. The speed data hold means is equivalent to the rate data RAM 125. The change-over means is equivalent to the selector 108. The means for holding a predetermined command are equivalent to the command memory 7, the parallel-serial converter 8 and the like. The command run means is equivalent to the command analyzing section 36 and the like.

As described above, the present invention achieves the following advantages.

Since the pulse generation circuit provided in the unit control section 20, it is not necessary to transmit driving pulses via a serial circuit.

Further, it is possible to obtain the count of actually generated pulse after operation of the pulse generation circuit. It is also possible to diagnose the state of the operation.

The pulse rate is basically accelerated or decelerated linearly, but it can be partially set per pulse.

Further, it is possible to perform a complex motor control while preventing an increase in cost, by combining a free curve acceleration-deceleration with a linear acceleration-deceleration.

Wires are reduced in numbers, by dividing a monitoring apparatus on the side of the CPU 2 and on the side of the sensors, and by transmitting multiplied sensor information between the side of the CPU 2 and the side of the sensors.

Moreover, the CPU 2 can recognize the analog levels of the sensors when necessary, by inputting analog levels of the sensors on the side of the sensors.

Further, since the analog levels are known, it is possible to cope with the dispersions, aging and the like of the sensor elements.

Moreover, the amount of the transmission is reduced, by comparing the analog levels with the slice levels on the side of the sensors and by transmitting only the results of ON/OFF.

Serial circuits can be reduced by comparing the analog levels with the slice levels on the side of the sensors, and by transmitting only the results of ON/OFF.

The motors can be controlled by hardware in the unit control sections.

According to the present invention, a motor control circuit and a control system using the same can be provided. In the control system, wherein it is possible to give the instructions of setting and operating the pulse generation circuit via a serial line. It is unnecessary to transmit driving pulses via a serial circuit by providing the pulse generation circuit on the side of the unit control section. It is possible to obtain the count of actually generated pulse after the operation of the pulse generation and to diagnose the state of the operation. The pulse rate is basically accelerated or decelerated linearly, but it can be partially set per pulse. Moreover, it is possible to perform a complex motor control while preventing an increase in cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. In a motor control circuit including a main control section and unit control section connected to the main control section controlling the circuit of the pulse motor, said unit control section comprising:

pulse generation means for generating control pulses of desired frequency by dividing the basic clock by a predetermined count value;

pulse count means for counting said control pulses;

first means for holding at least the information concerning the upper and lower limits of the speed:

second means for holding at least the information concerning the acceleration and deceleration speeds;

speed change means for increasing or decreasing the speed data gradually by counting the count of said pulse count means from the lower limit to the upper limit of the speed held in said first means, in accordance with a value corresponding to the acceleration or deceleration speed held in said second means; and means for instructing the rewriting the values held in said first and second means and the starting and stopping of the operation, wherein the rotation of said pulse motor is controlled in accordance with the commands supplied from said main control section.

2. The motor control circuit according to claim 1, wherein said unit control section further comprises:

rate data conversion means for converting speed data into count values used in said pulse generation means;

speed data hold means for holding speed data per pulse;

means for changing over between the outputs of said speed change means and the outputs of said speed data hold means and supplying them to said rate data conversion means; and means for controlling the combination of a linear acceleration with a free curve acceleration.

3. The motor control circuit according to claim 1, wherein said unit control section further comprises means for sending the values held by said pulse count means to said main control section.

4. The motor control circuit according to claim 1, wherein said unit control section further comprises:

pulse generation control means for controlling the generation of the pulse to output the pulse motor; and means for controlling the drive of the motors by a combination of different-phased pulses, a combination of basic pulses with positive-inverse signals, or a combination of positive pulses with negative pulses generated by said pulse generation control means.

5. The motor control circuit according to claim 1, wherein said unit control section further comprises:

dividing means for outputting a predetermined count value to said pulse generation means; and means for obtaining control pulse defining a predetermined multiple speed by dividing the basic clock by a predetermined count value output from said dividing means in said pulse generation means.

6. The motor control circuit according to claim 2, wherein said unit control section further comprises:

pulse generation control means for controlling the generation of the pulse to output the pulse motor; and means for controlling the drive of the motors by a combination of different-phased pulses, a combination of basic pulses with positive-inverse signals or a combination of positive pulses with negative pulses generated by said pulse generation control means.

7. The motor control circuit according to claim 2, wherein said unit control section further comprises:

dividing means for outputting a predetermined count value to said pulse generation means; and means for obtaining control pulse defining a predetermined multiple speed by dividing the basic clock by a predetermined count value output from said dividing means in said pulse generation means.

8. The motor control circuit according to claim 3, wherein said unit control section further comprising:

pulse generation control means for controlling the generation of the pulse to output the pulse motor; and means for controlling the drive of the motors by a combination of different-phased pulses, a combination of basic pulses with positive-inverse signals or a combination of positive pulses with negative pulses generated by said pulse generation control means.

9. The motor control circuit according to claim 3, wherein said unit control section further comprises:

dividing means for outputting a predetermined count value to said pulse generation means; and means for obtaining control pulse defining a predetermined multiple speed by dividing the basic clock by a predetermined count value output from said dividing means in said pulse generation means.

10. In a control system including a main control section and unit control section connected to said main control section and having a plurality of motor control circuits, said motor control circuit comprising:

means for generating a basic clock;

pulse generation means for generating control pulses of desired frequency by dividing the basic clock by a predetermined count value;

pulse count means for counting said control pulses;

rate data conversion means for converting the speed data into a count value used in said pulse generation means;

first means for holding at least the information concerning the upper and lower limits of the speed;

second means for holding at least the information concerning the acceleration and deceleration speeds; and means for increasing or decreasing the speed data gradually by counting the count of said pulse count means from the lower limit to the upper limit of the speed held in said first means, in accordance with a value corresponding to the acceleration or deceleration speed held in said second means, wherein said rate data conversion means is shared by said plurality of motor control circuits by setting different operation clocks in said plurality of motor control circuits.

11. In a control system including a main control section and unit control section connected to said main control section, said main control section comprising means for holding a predetermined command for controlling the operation of said unit control section, and said unit control section comprising:

motor control circuit comprising;

means for generating a basic clock;

pulse generation means for generating control pulses of desired frequency by dividing the basic clock by a predetermined count value;

pulse count means for counting said control pulses;

means for converting the speed data into a count value used in said pulse generation means;

first means for holding at least the information concerning the upper and lower limits of the speed;

second means for holding at least the information concerning the acceleration and deceleration speeds;

speed change means for increasing or decreasing the speed data gradually by counting the count of said pulse count means from the lower to the upper limit of the speed held in said first means, in accordance with a value corresponding to acceleration or deceleration speed held in said second means; and command run means for giving the instructions of rewriting the values held in said first and second means and of starting and stopping the operation corresponding to a predetermined command from said main control section.

12. The control system according to claim 11, further comprising:

means for sending the results of the operation performed corresponding to said predetermined command to said main control section.

13. The control system according to claim 11, further comprising:

means for sending the results of the operation performed corresponding to said predetermined command to said main control section; and means for setting an extra operation pulse count in said pulse count means in advance, wherein malfunctions due to backlash are prevented by the motor control circuits themselves.

14. The control system according to claim 11, further comprising:

pulse generation control means for controlling the generation of the pulse to output the pulse motor; and means for controlling the drive of the motors by a combination of different-phased pulses, a combination of basic pulses with positive-inverse signals or a combination of positive pulses with negative pulses generated by said pulse generation control means.

15. The control system according to claim 11, further comprising:

dividing means for outputting a predetermined count value to said pulse generation means; and means for obtaining control pulse defining a predetermined multiple speed by dividing the basic clock by a predetermined count value output from said dividing means in said pulse generation means.

16. The control system according to claim 12, further comprising:

pulse generation control means for controlling the generation of the pulse to output the pulse motor; and means for controlling the drive of the motors by a combination of different-phased pulses, a combination of basic pulses with positive-inverse signals or a combination of positive pulses with negative pulses generated by said pulse generation control means.

17. The control system according to claim 12, further comprising:

dividing means for outputting a predetermined count value to said pulse generation means; and means for obtaining control pulse defining a predetermined multiple speed by dividing the basic clock by a predetermined count value output from said dividing means in said pulse generation means.

18. The control system according to claim 13, further comprising:

pulse generation control means for controlling the generation of the pulse to output the pulse motor; and means for controlling the drive of the motors by a combination of different-phased pulses, a combination of basic pulses with positive-inverse signals or a combination of positive pulses with negative pulses generated by said pulse generation control means.

19. The motor control system according to claim 13, further comprising:

dividing means for outputting a predetermined count value to said pulse generation means; and means for obtaining control pulse defining a predetermined multiple speed by dividing the basic clock by a predetermined count value output from said dividing means in said pulse generation means.

20. In a motor control circuit including a main control section and unit control section connected to said main control section and controlling the circuit of the pulse motor, said unit control section comprising:

pulse generator obtaining control pulses of desired frequency by dividing the basic clock by a predetermined count value;

pulse counter counting said control pulses;

first storage holding at least the information concerning the upper and lower limits of the speed:

second storage holding at least the information concerning the acceleration and deceleration speeds;

speed changer increasing or decreasing the speed data gradually by counting the count of said pulse counter from the lower limit to the upper limit of the speed held in said first storage, in accordance with a value corresponding to the acceleration or deceleration speed held in said second storage; and instructor to rewriting the values held in said first and second storage and to starting and stopping the operation, wherein the rotation of said pulse motor is controlled corresponding to the commands from said main control section.

* * * * *